(12) United States Patent
Stratulate et al.

(10) Patent No.: US 11,802,641 B2
(45) Date of Patent: Oct. 31, 2023

(54) CLAMP WITH JAW ASSEMBLY AND METHOD OF USE

(71) Applicant: GARTECH, LLC, Houston, TX (US)

(72) Inventors: Gary Warren Stratulate, Houston, TX (US); Gary Pendleton, Shotley Bridge (GB)

(73) Assignee: GARTECH, LLC

( * ) Notice: Subject to any disclaimer, the term of this patent is extended or adjusted under 35 U.S.C. 154(b) by 237 days.

(21) Appl. No.: 17/063,464

(22) Filed: Oct. 5, 2020

(65) Prior Publication Data

US 2021/0102648 A1    Apr. 8, 2021

Related U.S. Application Data

(60) Provisional application No. 62/911,571, filed on Oct. 7, 2019.

(51) Int. Cl.
*F16L 23/04* (2006.01)
*F16L 25/06* (2006.01)

(52) U.S. Cl.
CPC .......... *F16L 23/04* (2013.01); *F16L 25/065* (2013.01); *Y10T 29/49826* (2015.01)

(58) Field of Classification Search
CPC ........ F16L 21/06; F16L 21/065; F16L 21/08; F16L 23/04; F16L 25/06; F16L 25/065; F16L 25/08; E21B 17/04; E21B 33/03
USPC ............... 285/242, 236, 420, 421, 406, 410
See application file for complete search history.

(56) References Cited

U.S. PATENT DOCUMENTS

| | | | | |
|---|---|---|---|---|
| 4,063,758 A | * | 12/1977 | Westberg | F16L 23/04 |
| 4,068,865 A | * | 1/1978 | Shanks, II | F16L 25/065 |
| 5,333,911 A | * | 8/1994 | Watkins | E21B 33/03 |
| 5,951,066 A | * | 9/1999 | Lane | E21B 33/03 |
| | | | | 285/406 |
| 8,430,433 B2 | * | 4/2013 | Maier | 285/411 |
| 8,646,813 B1 | * | 2/2014 | Shemtov | F16L 25/08 |
| 8,740,261 B2 | * | 6/2014 | Ford | |
| 10,400,925 B2 | * | 9/2019 | Pendleton | F16L 23/04 |
| 2011/0291409 A1 | * | 12/2011 | Kennedy, Jr. | F16L 25/065 |
| | | | | 285/421 |
| 2018/0328524 A1 | * | 11/2018 | Kobayashi | F16L 25/065 |

FOREIGN PATENT DOCUMENTS

CN        106439313 B    *    1/2019    ............. F16L 23/04

OTHER PUBLICATIONS

Essentra Components, "How and when to use washers effectively", Mar. 16, 2018, Essentra Components, pp. 1-2 (Year: 2018).*

* cited by examiner

*Primary Examiner* — Zachary T Dragicevich
*Assistant Examiner* — William S. Choi
(74) *Attorney, Agent, or Firm* — Ewing & Jones, PLLC

(57) ABSTRACT

An arrangement is disclosed having a clamp body configured in a cylindrical shape and having four penetrations that each have a bolt hole penetration with a first side penetration and a second side penetration and at least four jaws, each of the at least four jaws configured to be inserted into one of the at least four penetrations, each jaw having a first side and a second side.

21 Claims, 8 Drawing Sheets

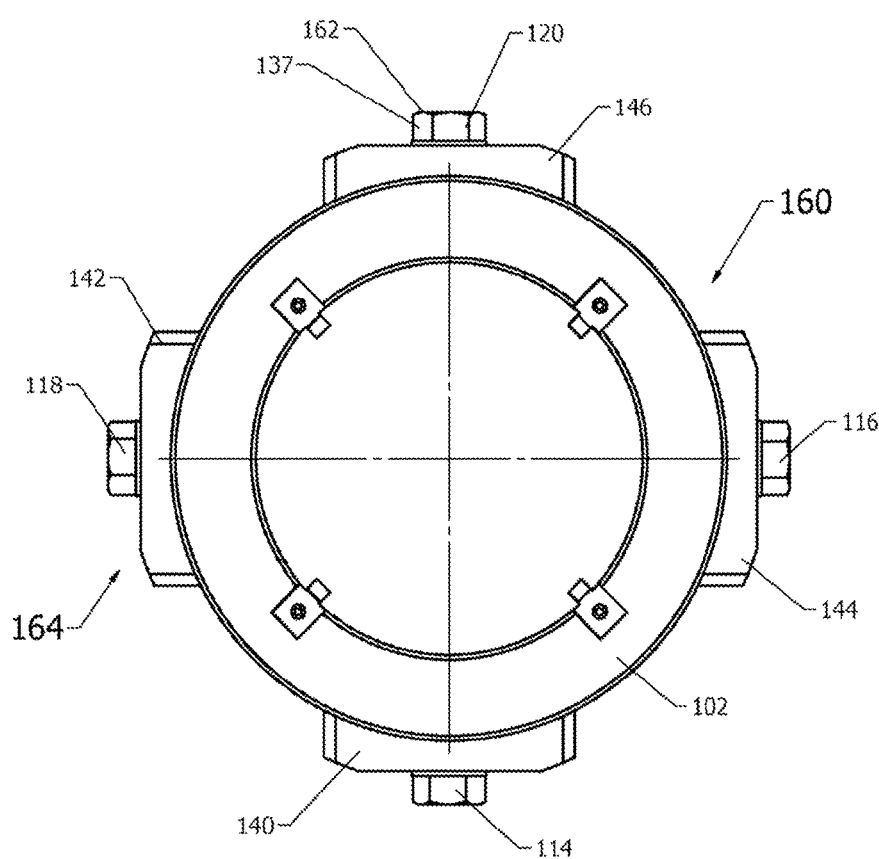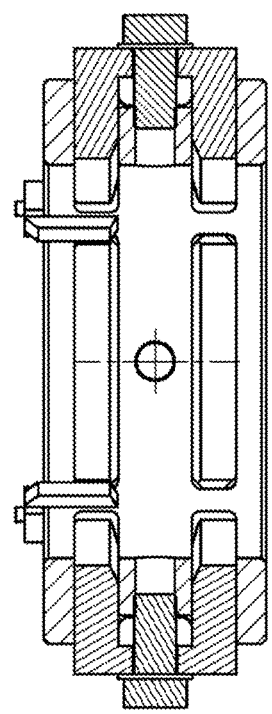
FIG. 2
FIG. 2A

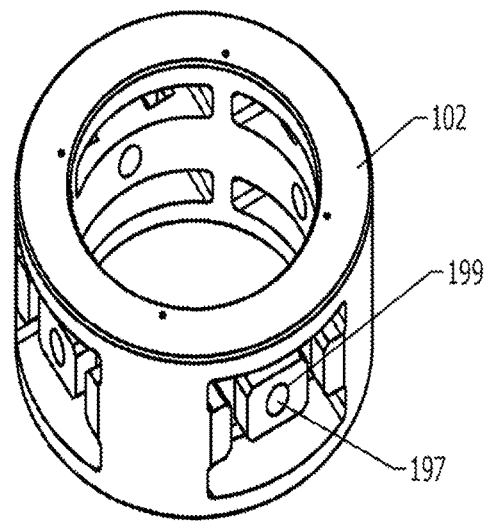
FIG. 4
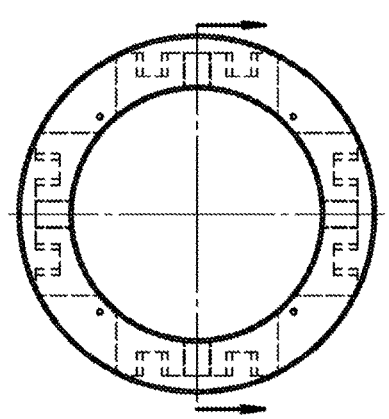 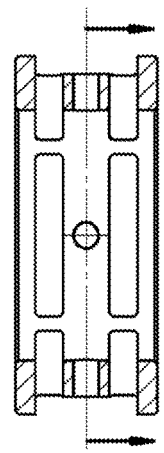 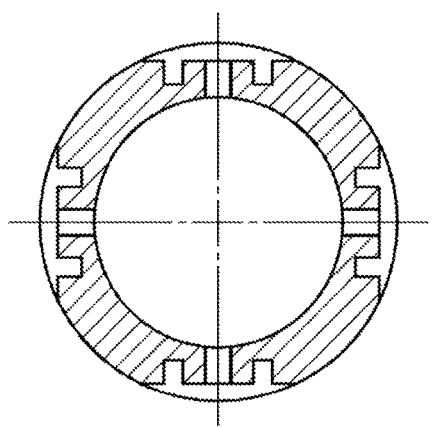
FIG. 4A  FIG. 4B  FIG. 4C

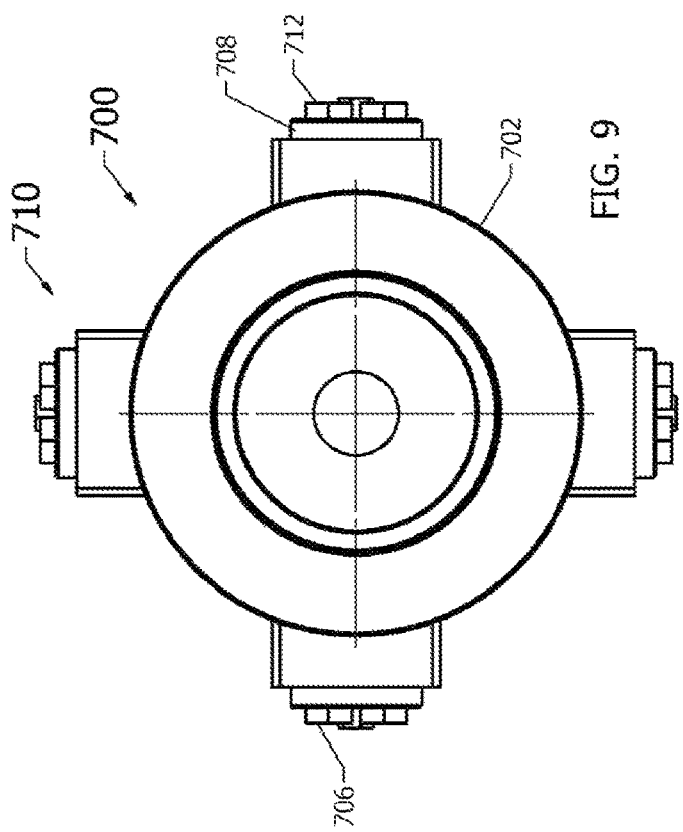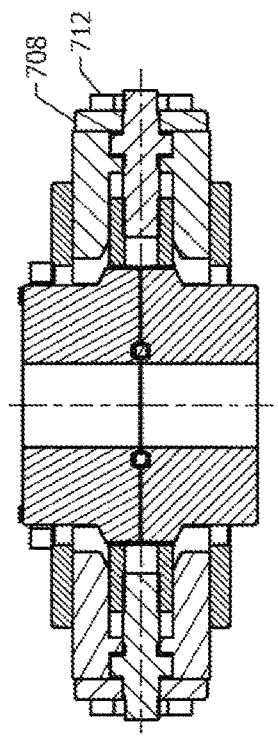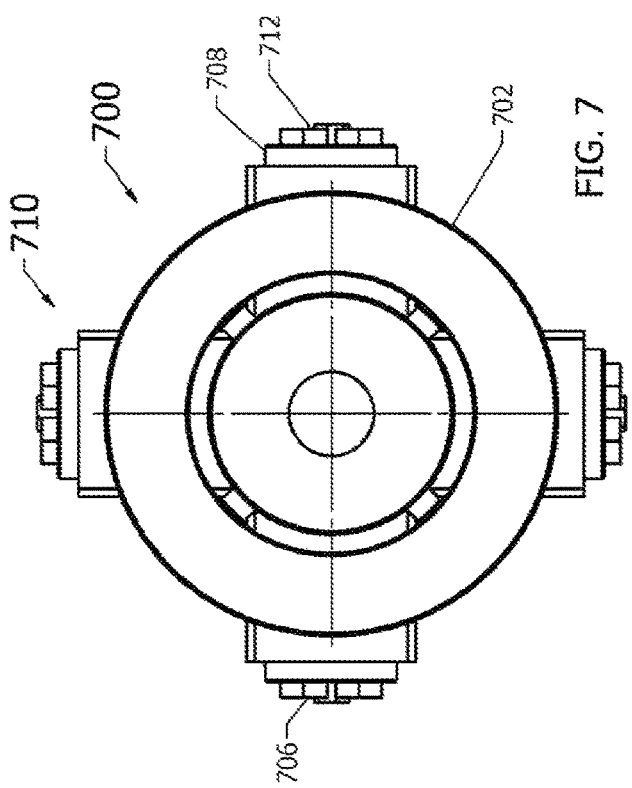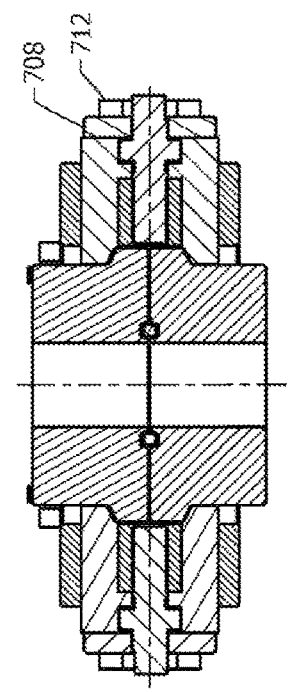

CLAMP WITH JAW ASSEMBLY AND METHOD OF USE

CROSS-REFERENCE TO RELATED APPLICATIONS

The present application claims priority to U.S. Provisional Application 62/911,571 dated Oct. 7, 2019, the entirety of which is incorporated by reference.

FIELD OF THE DISCLOSURE

Aspects of the disclosure relate to clamps. More specifically, aspects of the disclosure relate to clamping technology that provides secure holding power with economical construction.

BACKGROUND

Clamps are used to connect different mechanical components together in order to act as a simple mechanical component or system. Different types of clamps abound within industry with different types of clamps being used in different industries. In, the production of oil and gas, significant effort is placed upon safety of the clamping mechanisms. As oil and gas systems may be under high pressure and/or temperature, connections to these systems are required to be established to limit potential leakage. Incorrect establishment of a connection may result in not only leakage, but significant environmental liability of escaped hydrocarbons into the environment. Moreover, if the clamp were to fail in an area where workers/operators frequent, then significant worker safety issues may exist. Conventional clamp systems have many design deficiencies that impact the overall use of conventional clamp systems. Many conventional clamp systems are difficult to use, requiring two workers to install the clamp and take a significant amount of time to deploy. Such requirements double the labor cost for installation of the clamp, impacting overall economic effectiveness of the clamp system. Conventional clamp systems are also complicated to install, thereby requiring workers to be trained in using such clamp systems. Additionally, high torque equipment must be used to tighten conventional bolting. Such high torque equipment may not be present at remote job sites or available to smaller contractors. If training is not available, the workers must consult installation manuals to learn about the potential, complications with using such clamp systems.

Clamps that are used in such safety significant applications are extremely complicated. Specialty tools are used to establish such connections. Use of such specialty tools requires special training of operators, increasing the overall economic cost of such installations. Use of clamps in safety significant applications may be, for examples use in the recovery of hydrocarbons, energy production from coal and/or natural gas and nuclear operations.

There is a need to provide a clamp that provides a mechanical connection that is secure in high pressure and high temperature environments.

There is a further need to provide a clamp that is economical to produce for such high pressure and high temperature environments.

There is a still further need to provide a clamp that uses conventional tools to establish a connection and that does not require specialized training.

There is a need to provide a clamp that may connect two piping systems, wherein the clamp is installable by a single worker.

There is a need to provide a clamp that can be installed and deployed quickly.

There is a further need to provide a clamp that may connect two piping systems wherein portions of the clamp may be replaceable if components of the clamp become damaged.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept. Furthermore, the following summary should not be used to limit the described embodiments, but rather provide several examples of the aspects disclosed.

In one non-limiting embodiment, a method for establishing a connection with a clamp is disclosed. The method may comprise identifying a first piping system for connection to a second piping system and positioning a first end of a clamp on an end of the first piping system. The method may further comprise inserting a second piping system into a second end of the clamp and torqueing at least four bolts of the clamp onto the first piping system and the second piping system, such that at least four jaws of the clamp engage both the first piping system and the second piping system.

In one non-limiting embodiment, an arrangement is disclosed. The arrangement may comprise a clamp body configured in a cylindrical shape, the clamp body having at least four penetrations, each of the at least four penetrations having a bolt hole penetration with a first side penetration and a second side penetration. The arrangement may also comprise at least four jaws, each of the at least four jaws configured to be inserted into one of the at least four, penetrations, each jaw having a first side and a second side, the first side configured to insert into the first side penetration, and the second side configured to insert into the second side penetration, each of the at least four jaws having a penetration. The arrangement may also comprise at least four bolts, each of the at least four bolts configured to be inserted into both the penetration of each jaw and the bolt hole penetration of the clamp body.

In another embodiment, a method for establishing, a connection between a first piping system and a second piping system with a clamp is disclosed. The method may comprise positioning a first end of the clamp on an end of the first piping system. The method may further comprise placing an end of a second piping system into a second end of the clamp. The method may also comprise engaging a series of jaws from the clamp on to both the first piping system and the second piping system.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure, and are therefore not to be considered limiting of its scope, for the disclosure may admit to other equally effective embodiments. In some illustrated embodiments, portions or parts of the arrangements are omitted for sake of clarity, and these omissions should not be considered to limit the aspects of the disclosure.

FIGS. 2, 2A are a side elevation view and cross section view, respectively, of the clamping device of claim 1, wherein the jaws illustrated are presented in an open jaw position.

FIG. 4 is a perspective view of a clamping body of the clamping device described in relation to FIG. 1. FIG. 4A is a top, partially transparent view of the clamping body of FIG. 4. FIG. 4B is a cross section view of the clamping body of FIG. 4A. FIG. 4C is a cross section view of the clamping body of FIG. 4B.

FIG. 7 is a plan view of a clamp in a closed position in another example embodiment of the disclosure.

FIG. 8 is a cross-sectional view of the clamp of FIG. 7.

FIG. 9 is a plan view of the clamp of FIG. 7 in a clamp open position.

FIG. 10 is a cross-sectional view of the clamp of FIG. 9 in a clamp open position.

Figure 1:
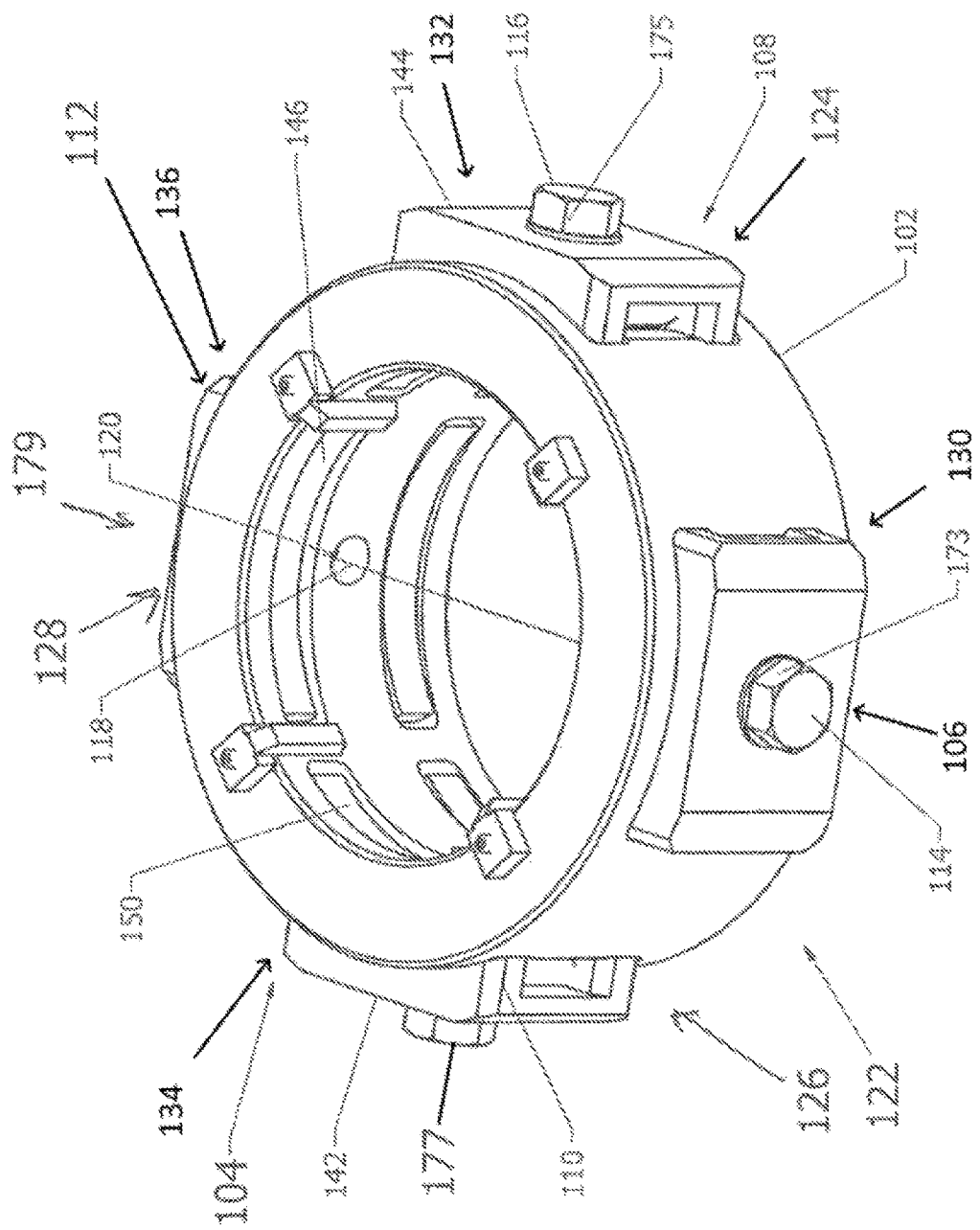
FIG. 1 is a perspective view of a clamping device, in accordance with one example embodiment of the disclosure.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments, Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter, disclosed herein and shall not be considered to be an element or limitation of the claims except where explicitly recited in a claim.

Although the terms first second, third, etc., may be used herein to, describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there, may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Aspects of the disclosure relate to clamping systems. More specifically, aspects of the disclosure relate to both methods and apparatus used to provide a clamping pressure between two different components. In the illustrated embodiments, the clamping force generated is between a first piping system and a second piping system. The first piping system and the second piping system may be used to transport fluid, such as petrochemicals and/or hydrocarbons under extreme pressure. The arrangements illustrated allow for safe connection of the clamp mechanisms to prevent fluids from spilling or exiting the piping systems into areas that the fluids are not desired. The methods described may be performed by a single person establishing a connection between two different piping systems or may be performed by more than one person. Method steps accomplished in the methods recited may be performed by manual operated tools or by automatic tools. In instances where possible, method steps may be performed by tools.

Aspects of the disclosure provide for connection technology that is easily installed without using excessive manpower to establish the connection. As a non-limiting example, a connection may be established between two piping systems by a single worker. Connections may be used through use of common tools, such as wrenches, that are readily understandable by field personnel. Training on how to establish a connection using the clamping mechanism is minimally needed.

In the embodiments, reference is made to an "arrangement" which includes individual components that may be assembled together. As will be understood, the arrangement is the clamping mechanism used for connection of the mechanical systems.

Referring to FIG. 1, perspective view of one aspect of the disclosure involving a clamp is illustrated. An arrangement 100 is illustrated that may be used for providing a clamping force to another object. The arrangement 100 is configured with a clamp body 102. The clamp body 102 is configured in a generally cylindrical shape 104. As will be understood, the clamp body 102 may be configured in other shapes, therefore the clamp body 102 illustrated should not be considered limiting. The clamp body 102 may have a first penetration 106, a second penetration 108, a third penetration 110 and a fourth penetration 112. Each of the penetrations 106, 108, 110, 112 has a bolt penetration 114, 116, 118, 120 respectively. Additionally, each of the penetrations 106, 108, 110, 112 has first side penetration 122, 124, 126, 128 and a second side penetration 130, 132, 134, 136. At least four jaws 140, 142, 144, 146 are presented and are configured to be inserted into one of the first penetration 106, second penetration 108, third penetration 110 and fourth penetration 112.

Further referring to FIG. 1, each of the at least four jaws 140, 142, 144 and 146 is configured with a first side 150, and a second side 152. The first side 150 is, configured to be inserted into the first side penetration 122, 124, 126, 128 and the second side 152 is configured to be inserted into the second side penetration 130, 132, 134, 136. Each of the four jaws 140, 142, 144, 146 are configured with a penetration 160, 162, 164, 166. Although described as "jaws" 140, 142, 144, 146, different surface patterning may be used for each element. In the instance where piping systems being clamped may have soft metallic properties, such as copper, having a non-serrated jaw may be beneficial to prevent damage to components of the receiving piping system. In other situations, where a leak tight seal is required, and there is less concern for damage to piping systems, serrated edges may be used. As will be understood, aspects of the disclosure provide a quick and economical attachment to existing systems that does not have the drawbacks of conventional systems. The aspects of the disclosure provide for easy installation from workers/installers with minimal training, compared to specialized workers using specialized equipment that may not be present at a work site.

In the embodiment disclosed, the first penetration 106, the second penetration 108, the third penetration 110 and fourth penetration 112 are equidistantly spaced around the clamp body 102. The jaws 140, 142, 144, 146, due to the anticipated stress from clamping, may be provided with a stiffener 512. A second set of stiffeners 514 may also be positioned to connect a first side of the jaw 150 with a second side 152 (see FIG. 5). In the illustrated embodiment, the arrangements provide for a near full circumferential contact when installed.

At least four bolts 173, 175, 177, 179 are positioned within the arrangement 100 such that torqueing of the at least four bolts 173, 175, 177, 179 causes each jaw 140, 142, 144, 146 to move from an open position to a closed position. As will be understood, a hole 197 is provided for each of the at least four bolts 173, 175, 177, 179 such that each bolt may be retained within the hole 197. The hole 197 is provided with a threading 199. In embodiments, each of the bolts 173, 175, 177, 179 are provided with a threading 155 that matches the threading 199 of the hole 197 (see FIG. 4). Each bolt 173, 175, 177, 179 is provided with a head 137. The head 137 may be engaged by a wrench, socket or other driving mechanism to rotate each of the at least four bolts 173, 175, 177, 179 in to or out of the threading 199 within the hole 197. For purposes of decreasing the necessary torque to be placed on each head 137 of each bolt 173, 175, 177, 179, lubricant may be added to, the threads, thereby decreasing the friction between the threading 199 and each of the at least four bolts 173, 175, 177, 179. In the embodiments described, the torque placed on each bolt 173, 175, 177, 179 may be of an equivalent value. In other embodiments, different torque values may be used on each bolt 173, 175, 177, 179. As multiple, connections may be made with each arrangement 100, allowable levels of torque for each bolt may be placed by a tag or placed into a surface of the arrangement 100 in order to allow for operators to quickly ascertain the needed torque values for each of the bolts 173, 175, 177, 179. The bolts 173, 175 177, 179 may be replaceable within the arrangement 100 to allow for repair if threads become galled or damaged. Moreover, different materials may be used for different bolts 173, 175, 177, 179 to allow for greater torque values to be used.

Referring to FIG. 2, a plain view of the clamp of FIG. is illustrated. In this embodiment, the jaws 140, 142, 144, 146 are in an open position. As presented, each of the at least four jaws 140, 142, 144, 146 is located with the respective first penetration 106, second penetration 108, third penetration 110 and fourth penetration 112.

Figure 3:
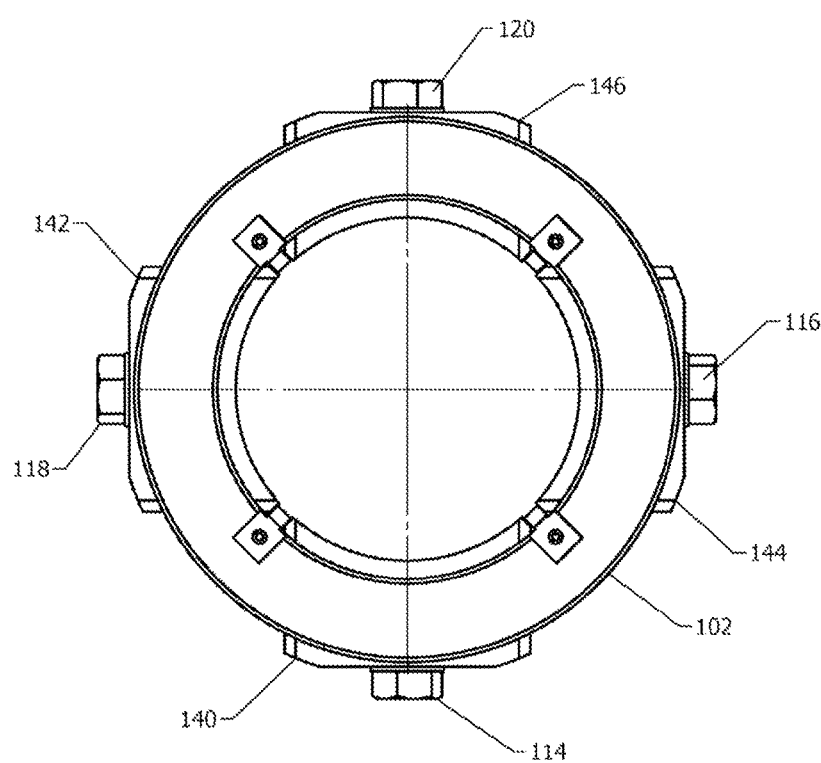
FIGS. 3, 3A are a side elevation view and cross section view, respectively, of the clamping device of claim 1, wherein the jaws illustrated are presented in a closed jaw position.
Figure 3A:
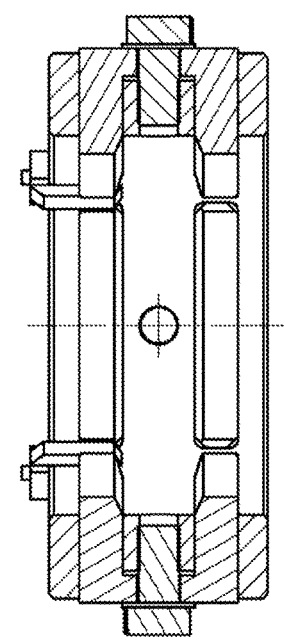

Referring to FIG. 3, a plan view of the clamp of FIG. 1 is illustrated with the jaws in a closed position. As such, the jaws 140, 142, 144, 146 are closed to provide a clamping force. In the illustrated embodiment, the jaws 140, 142, 144, 146 may range from the fully open position, as provided in FIG. 2, to any intermediate position to the closed position.

Referring to FIG. 4, the clamp body 102 of FIG. 1 is illustrated. In this illustrated embodiment, the clamp body 102 is generally cylindrical in shape. In the components described above in relation to FIGS. 1 through 4, the components may be made of metallic materials for rugged service. Such metallic materials may be, for example, different types of carbon steel to provide sufficient clamping and sheer forces during tightening and loosing of the arrangement 100, In other embodiments, stainless steels may also be used. Furthermore, specialty materials, such as titanium or alloys of the above materials may be used in non-limiting embodiments.

Figure 5:
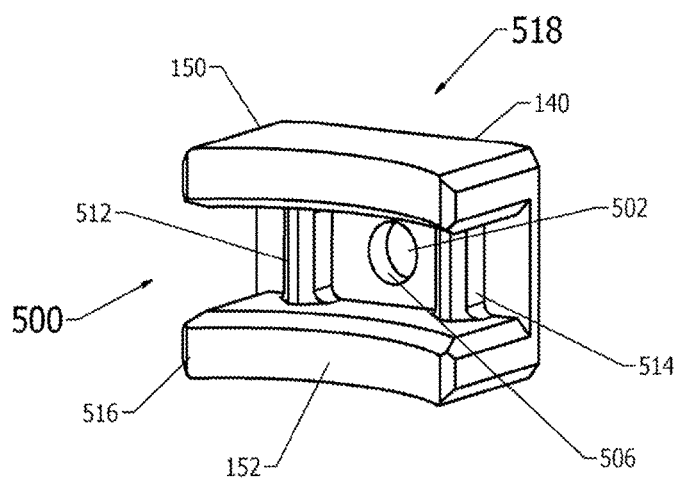
FIG. 5 is side perspective view of a clamp jaw of the clamping device described in relation to FIG. 1.
Figure 5A:
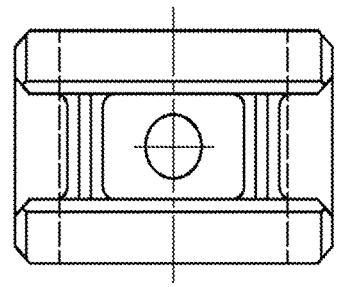
FIGS. 5A-5D are various additional views of the clamp jaw of FIG. 5.
Figure 5B:
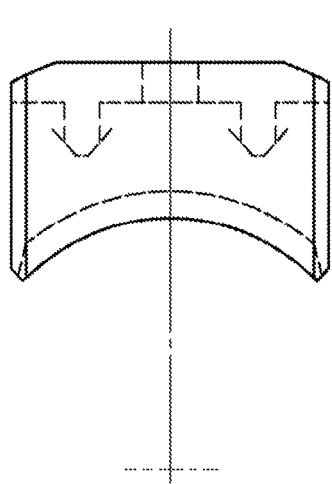
Figure 5C:
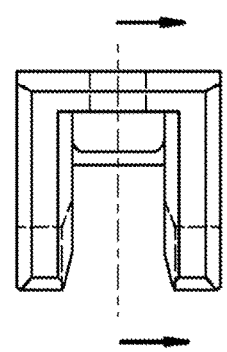
Figure 5D:
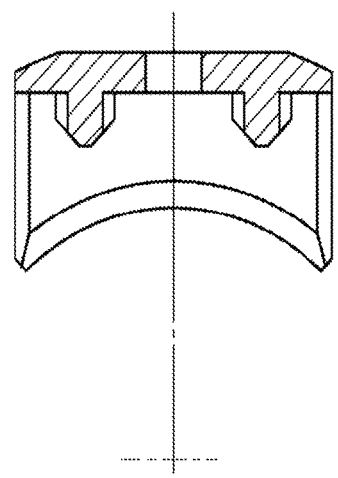

Referring to FIG. 5, a perspective of clamp jaws of FIG. 1 is illustrated. In the illustrated embodiment, each jaw 140 is provided with penetration 502 through a top face 504 of the jaw 500. The penetration 502 is configured such that a bolt (not shown for clarity) may be installed through, the penetration 502. The penetration may be configured with threads 506 that match threading placed on the bolt. An inner face 510 is provided that is concave in shape. In the illustrated embodiment, four (4) clamp jaws are used in equidistant positions around the clamp. Two stiffeners 512, 514 are placed below the top face 504 to connect a first side 516 and a second side 518. As will be understood, the number of clamp jaws (4) may be altered according to the size of the connection desired to be connected. As an example, the number of clamp jaws may be two (2) for smaller connections. In other examples, three (3) or greater clamps may be used.

Figure 6:
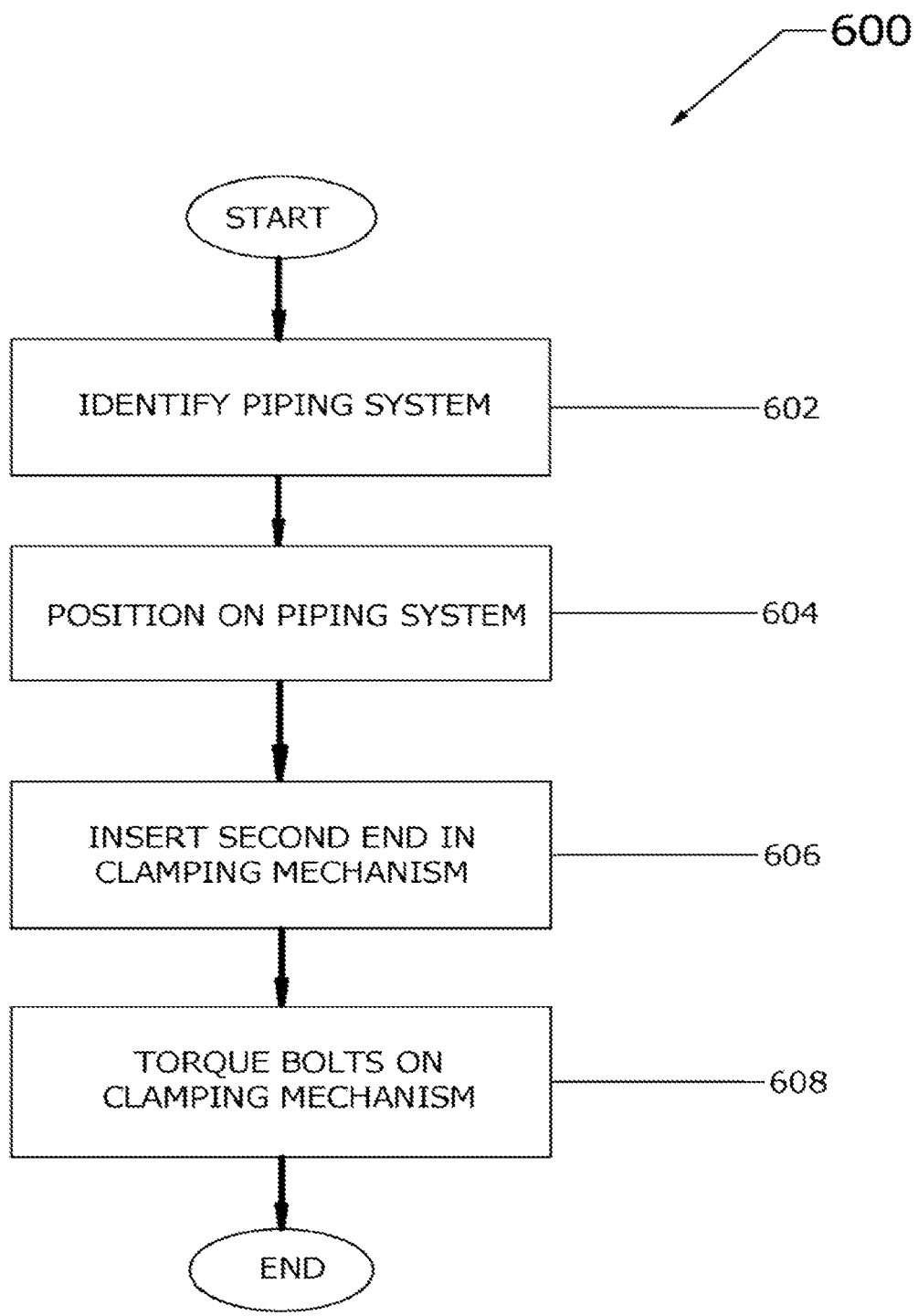
FIG. 6 is a method for establishing a connection between a clamp and a mechanical system in conformance with one example embodiment of the disclosure.

Referring to FIG. 6, a method 600 for establishing a connection with a clamp to a mechanical system is illustrated. At 602, a first piping system is identified for connection to a second piping system. At 604, a clamping mechanism is positioned over an end of the first piping system. At 606, a second piping system is inserted into a second end of the clamping mechanism. At 608, at least four (4) bolts of the clamping system are torqued such that a portion of at least 4 jaws of the clamping system engage both the first piping system and the second piping system. In some embodiments, the at least 4 jaws are torqued by action of a bolt that penetrates a jaw and at least one section of the clamp. The at least one section may be, for example, a threaded bolt retainer. As will be understood, torqueing the bolts may be done in specific sequences to establish a proper connection. In the embodiments disclosed, aspects of the disclosure may establish a connection within thirty minutes, compared with 5 to 6 hours for conventional connections. As will be also understood, time savings for larger connections are larger than simple small size connections.

In another example embodiment, a clamp is disclosed. The clamp may comprise a main body ring with at least four openings. The clamp may also comprise at least four clamp jaws, each of the at least four clamp jaws configured to be inserted in to at least one opening. The clamp may further comprise at least four clamp screws, each of the at least four clamp screws positioned in each of the at least four clamp jaws. The clamp may further comprise at least four clamp plates, each of the at least four clamp plates configured over one of the at least four clamp screws. The clamp may also further comprise a mechanical connection connecting each of the at least four clamp plates to one of the at least four clamp jaws.

Referring to FIG. 7, another example embodiment of the disclosure is illustrated. A clamp 700 is illustrated in in a clamp closed position. FIG. 8 is a cross-sectional view of the clamp 700. The clamp 700 is configured with a main body ring 702 that allows quick connection to a piping system. A clamp jaw 704 is also provided to provide for an interface with the clamp 700. A clamp screw 706 is provided to connect the clamp jaw 704 to the main body ring 702. The clamp screw 706 may be removably inserted or withdrawn from the main body ring 702, thereby providing a clamping action of the clamp jaw 704 around a piping system. As will be understood, the interface between the clamp jaw 704 and the clamp screw 706 is a threaded connection.

Still referring to FIG. 7, a clamp plate 708 is provided on an exterior side of the clamp screw 706. The clamp plate 708 interfaces with a head 710 of the clamp screw 706 to provide a bearing force on the head 710. A cap screw 712 may also be used at to attach to the clamp screw 706, wherein the cap screw 712 is positioned on the exterior of the clamp 700.

As illustrated, four clamp jaws 704 are provided to interface with a piping system in a round configuration. The piping system may fit longitudinally 714 within the clamp 700.

Referring to FIG. 9, the clamp 700 is illustrated in a clamp open position. As illustrated, the clamp jaws 704 are retracted within the main body ring 702. This may be accomplished by loosening the clamp screws 706 located on each clamp jaw 704. Referring to FIG. 10, the clamp open position illustrated in FIG. 9, is illustrated in a cross-sectional view. The clamp 700 is illustrated with a retracted clamp screw 706 to allow for retraction of the clamp jaws 704.

Figure 11:
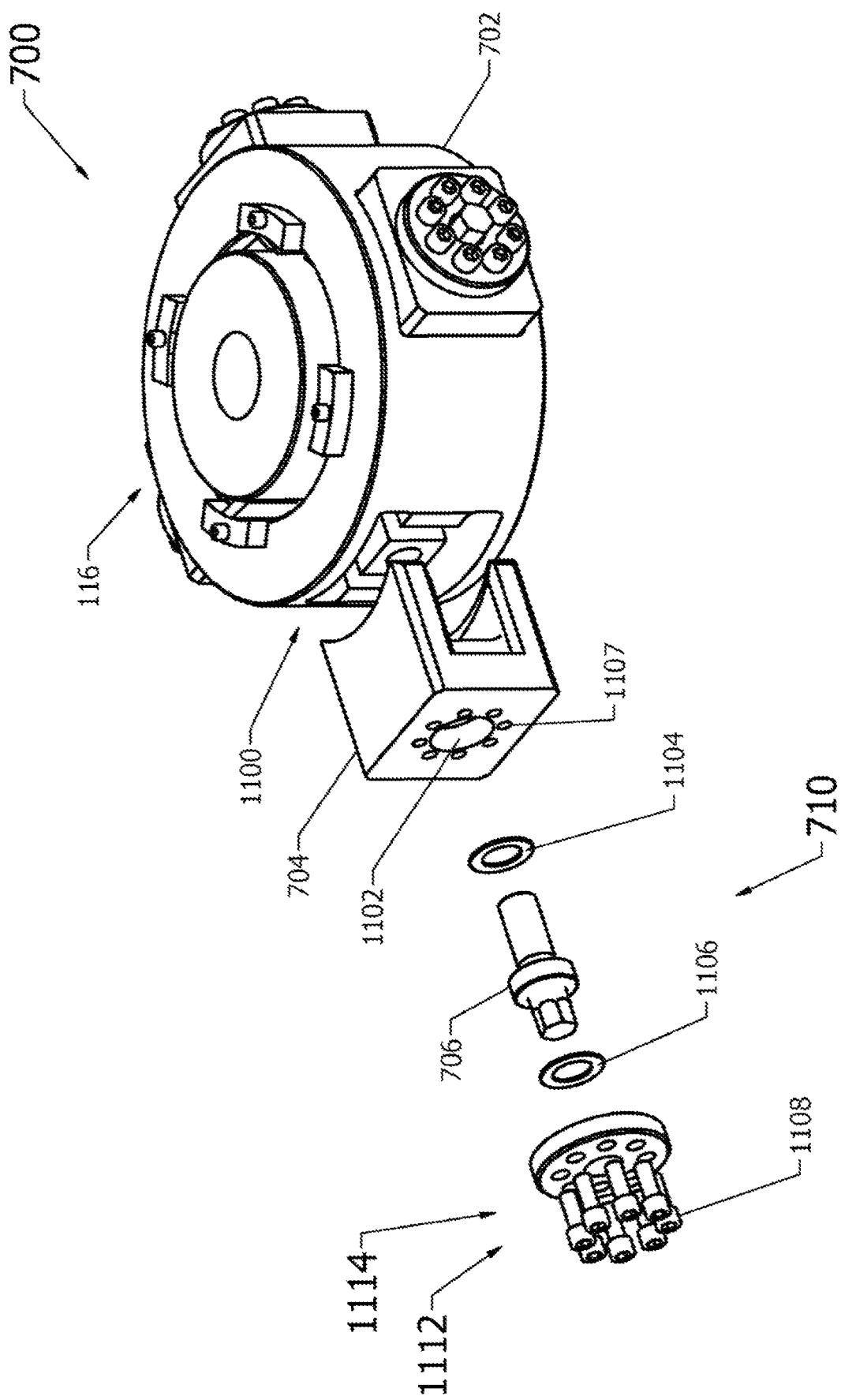
FIG. 11 is an exploded view of the clamp of FIG. 7.

Referring to FIG. 11, an exploded view of the clamp 700 of FIG. 7 is illustrated. In this illustrated embodiment, four openings 1100 are provided for insertion of clamp jaws 704. As illustrated, the main body ring 702 is provided with a screw hole attachment 1102 that allows the clamp screw 706 to be inserted through the clamp jaw 704 and into the main body ring 702. The screw hole attachment 1102 is threaded to allow insertion of the clamp screw 706 such that the clamp screw 706 may be rotated and tightened within the main body ring 702. The clamp screw 706 is configured to be inserted into the main body ring while portions of the clamp screw 706 contact the clamp jaw 704. The contact with the clamp jaw provides a force on to the clamp jaw 704 that is axially directed toward the center of the main body ring 702.

Two washers 1104, 1106 are placed on either side of the clamp screw 706 or cap screw 712 to protect against marring. The clamp plate 708 is positioned around the clamp screw 706 or cap screw 712 to allow for insertion of the clamp screw 706 or cap screw 712. In the illustrated embodiment, eight clamp screws 706 and/or cap screws 712 are provided for connection of the clamp plate 708 to receiving holes 1107 within the clamp jaw 704. The heads of the clamp screws 706 or cap screws 712 may be configured with a hexagon inner surface 1108 to allow a mating tool (not shown) to torque the clamp screw 706 or cap screw 712. The clamp jaw 704 has receiving holes 1107 that are threaded to mate with the clamp screws 706 or cap screws 712 during rotation.

The placement of the clamp plate 708 to an exterior side of the clamp screw 706 prevents the clamp screw 706 from inadvertently backing out of the clamp 700 as the expanded area 1108 has an outer surface 1112 that will bear upon an inner surface 1114 of the clamp plate 708.

The clamp jaws 704 are configured to fit within the opening 1100 to allow for sliding insertion of the jaws 704. The inner surface 1114 of the clamp jaws 704 is configured to form a semi-circle that will abut the piping system being attached. In the installation, a space 1116 is provided between each clamp jaw 704 when the jaws 704 are fully inserted into the main body ring 702, This space 1116 prevents contact between each clamp jaw 704 when in the closed configuration, as illustrated in FIG. 7. The size of the space between the clamp jaws 704 may be varied to allow for smaller piping systems to be engaged. In other embodiments, the inner surface 1114 of the clamp jaws 704 may be varied in, shape to allow for contact with smaller piping systems. In other embodiments, the inner surface 1114 may be configured, for example, for a two point contact on the inner surface 1114 with the piping system. In still further embodiments, the inner surface may be textured to allow for a rough surface allowing gripping of the clamp jaw 704 on to the piping system.

Aspects of the disclosure provide a clamp that provides a mechanical connection that is secure in high pressure and high temperature environments superior to, conventional clamping mechanisms, Materials used in construction of the clamping mechanism may be altered according to the stress levels that will be experienced during service life. Clamp materials may be made of metallic components, such as aluminum, stainless steel, carbon steel, and titanium as non-limiting embodiments.

Aspects of the disclosure also provide a clamp that is economical to produce for such high pressure and high temperature environments. Production of such a clamp may be varied such that larger or smaller versions of the clamping mechanism may be made according to the size of the connection desired to be made.

Further aspects of the disclosure provide, a clamp that uses conventional tools to establish a connection and that does not require specialized training. The conventional tools may include, as non-limiting embodiments conventional wrenches, ratchets or air operated ratchets.

Aspects of the disclosure also provide for a clamp that uses conventional tools to establish a connection, and that does not require specialized training.

Further aspects of the disclosure provide for a clamp that connects two piping systems, wherein the clamp is installable by a single worker.

Still further aspects of the disclosure provide a clamp that connects two piping systems wherein portions of the clamp may be replaceable if components of the clamp become damaged.

In one non-limiting embodiment, a method for establishing a connection with a clamp is disclosed. The method may comprise identifying a first piping system for connection to a second piping system and positioning a first end of a damp on an end of the first piping system. The method may further comprise inserting a second piping system into a second end of the clamp and torqueing at least four bolts of the clamp onto the first piping system and the second piping system, such that at least four jaws of the clamp engage both the first piping system and the second piping system. As will be understood, other numbers of bolts may be used in such a configuration and such an embodiment should not be considered limiting.

In one non-limiting embodiment, the method may be performed wherein each of the at least four bolts of the clamp are configured to engage both a clamp body and one of the at least four jaws.

In, one non-limiting embodiment, the method may be performed wherein each of the at least four bolts of the clamp engages the clamp body in a threaded hole.

In another non-limiting embodiment, the method may be performed wherein each of the at least four bolts is threaded to match the threaded hole.

In another non-limiting embodiment, the method may be performed wherein the end of the first piping system and the end of the second piping system are each flanged, ends.

In one non-limiting embodiment, an arrangement is disclosed. The arrangement may comprise a clamp body configured in a cylindrical shape, the clamp body having at least four penetrations, each of the at least four penetrations having a bolt hole penetration with a first side penetration and a second side penetration. The arrangement may also comprise at least four jaws, each of the at least four jaws configured to be inserted into one of the at least four penetrations, each jaw having a first side and a second side, the first side configured to insert into the first side penetration, and the second side configured to insert into the second side penetration, each of the at least four jaws having a penetration. The arrangement may also comprise at least four bolts, each of the at least four bolts configured to be inserted into both the penetration of each jaw and the bolt hole penetration of the clamp body.

In another embodiment, the arrangement may be configured wherein the at least four penetrations are equidistantly spaced around the clamp body.

In another embodiment, the arrangement may be configured wherein each jaw has at least one stiffener.

In another embodiment, the arrangement may be configured wherein each jaw has at least two stiffeners, and each of the at least two stiffeners are positioned to connect a first side of the jaw to a second side of the jaw. In another embodiment other numbers of stiffeners may be used. The number of stiffeners may be used to according to desired or anticipated stress levels in the arrangement and piping system.

In another embodiment, the arrangement may be configured wherein each jaw of the arrangement is configured to move from an open position to a closed position upon a torque of each of the at least four bolts.

In another embodiment, a method for establishing a connection between a first piping system and a second piping system with a clamp is disclosed. The method may comprise positioning a first end of the clamp on an end of the first piping system. The method may further comprise placing an end of a second piping system into a second end of the clamp. The method may also comprise engaging a series of jaws from the clamp on to both the first piping system and the second piping system.

In another embodiment, the method may be, performed wherein the engaging the series of jaws from the clamp comprises: torqueing at least four bolts to move the series of jaws from an open configuration to a closed configuration.

In another embodiment, the method may be performed wherein each of the at least four bolts of the clamp are configured to engage both a clamp body and one of the at least four jaws.

In another embodiment, the method may be performed wherein each of the at least four bolts of the clamp engages the clamp body in a threaded hole. In other embodiments, other numbers of bolts, either less or more, may be used.

In another embodiment, the method may be performed wherein each of the at least four bolts is threaded to match the threaded hole.

In another embodiment, the method may be performed wherein the end of the first piping system and the end of the second piping system are each flanged ends.

In another embodiment, the method may be performed wherein the engaging the series of jaws from the clamp on to both the first piping system and the second piping system is a series of at least two jaws.

In another embodiment, the method may be performed wherein the engaging the series of jaws from the clamp on to both the first piping system and the second piping system is a series of at least four jaws.

In another example embodiment, a clamp is disclosed. The clamp may comprise a main body ring with at least four openings. The clamp may also comprise at least four clamp jaws, each of the at least four clamp jaws configured to be inserted in to at least one opening. The clamp may further comprise at least four clamp screws, each of the at least four clamp screws positioned in each of the at least four clamp jaws. The clamp may further comprise at least four clamp plates, each of the at least four clamp plates configured over one of the at least four clamp screws. The clamp may also further comprise a mechanical connection connecting each of the at least four clamp plates to one of the at least four clamp jaws.

In a further embodiment, the clamp may further comprise at least a first washer placed between the at least one claim screw and each of the at least four clam jaws.

In a further embodiment, the clamp may further comprise at least a second washer placed between the at least one clamp screw and the clamp plate.

In a further embodiment, the clamp may further be configured wherein the mechanical connection is at least one cap screw.

In a further embodiment, the clamp may be further configured wherein there are at least 32 cap screws.

Although specific embodiments of the invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

What is claimed is:

1. A clamp, comprising:
a main body ring with at least four openings;
at least four clamp jaws, each of the at least four clamp jaws configured to be inserted in to at least one opening;
at least four clamp screws, each of the at least four clamp screws positioned in each of the at least four clamp jaws;
at least four clamp plates, each of the at least four clamp plates configured over one of the at least four clamp screws; and
a mechanical connection connecting each of the at least four clamp plates to the at least four clamp jaws wherein each jaw has at least two stiffeners, and each of the at least two stiffeners are positioned to connect a first side of the jaw to a second side of the jaw.

2. The clamp according to claim 1, wherein the mechanical connection is at least one screw.

3. The clamp according to claim 2, wherein the mechanical connection has at least 32 screws.

4. An arrangement, comprising:
a clamp body configured in a cylindrical shape, the clamp body having at least four penetrations, each of the at least four penetrations having a bolt hole penetration with a first side penetration and a second side penetration; and
at least four jaws, each of the at least four jaws configured to be inserted into one of the at least four penetrations, each jaw having a first side and a second side, the first side configured to insert into the first side penetration, and the second side configured to insert into the second side penetration, each of the at least four jaws having a penetration; and
at least four bolts, each of the at least four bolts configured to be inserted into both the penetration of each jaw and the bolt hole penetration of the clamp body wherein each jaw has at least two stiffeners, and each of the at least two stiffeners are positioned to connect the first side of the jaw to the second side of the jaw.

5. The arrangement according to claim 4, wherein the at least four penetrations are equidistantly spaced around the clamp body.

6. The arrangement according to claim 4, wherein each jaw of the arrangement is configured to move from an open position to a closed position upon a torque of each of the at least four bolts.

7. The arrangement according to claim 4, wherein at least one of the clamp body, the at least four jaws, and at least four bolts is made of a metallic material.

8. The arrangement according to claim 7, wherein the metallic material is one of carbon steel, aluminum, and titanium.

9. A method for establishing a connection with a clamp, comprising:

identifying a first piping system for connection to a second piping system;
positioning a first end of a clamp on an end of the first piping system;
inserting an end of a second piping system into a second end of the clamp; and
torqueing at least four bolts of the clamp onto the first piping system and the second piping system, such that at least four jaws of the clamp engage both the first piping system and the second piping system wherein each jaw has at least two stiffeners, and each of the at least two stiffeners are positioned to connect a first side of the jaw to a second side of the jaw.

10. The method according to claim 9, wherein each of the at least four bolts of the clamp are configured to engage both a clamp body and one of the at least four jaws.

11. The method according to claim 10, wherein each of the at least four bolts of the clamp engages the clamp body in a threaded hole.

12. The method according to claim 11, wherein each of the at least four bolts is threaded to match the threaded hole.

13. The method according to claim 9, wherein the end of the first piping system and the end of the second piping system are each flanged ends.

14. A method for establishing a connection between a first piping system and a second piping system with a clamp, comprising:
positioning a first end of the clamp on an end of the first piping system;
placing an end of a second piping system into a second end of the clamp; and
engaging a series of jaws from the clamp on to both the first piping system and the second piping system wherein each jaw has at least two stiffeners, and each of the at least two stiffeners are positioned to connect a first side of the jaw to a second side of the jaw.

15. The method according to claim 14, wherein the engaging the series of jaws from the clamp comprises:
torqueing at least four bolts to move the series of jaws from an open configuration to a closed configuration.

16. The method according to claim 15, wherein each of the at least four bolts of the clamp are configured to engage both a clamp body and one of the at least four jaws.

17. The method according to claim 14, wherein each of at least four bolts of the clamp engages the clamp body in a threaded hole.

18. The method according to claim 17, wherein each of at least four bolts is threaded to match the threaded hole.

19. The method according to claim 14, wherein the end of the first piping system and the end of the second piping system are each flanged ends.

20. The method according to claim 14, wherein the engaging the series of jaws from the clamp on to both the first piping system and the second piping system is a series of at least two jaws.

21. The method according to claim 20, wherein the engaging the series of jaws from the clamp on to both the first piping system and the second piping system is a series of at least four jaws.

* * * * *